US012691827B2

(12) United States Patent
Funnye

(10) Patent No.: US 12,691,827 B2
(45) Date of Patent: Jul. 28, 2026

(54) VEHICLE CAMERA SYSTEM

(71) Applicant: Raymond Funnye, Chicago, IL (US)

(72) Inventor: Raymond Funnye, Chicago, IL (US)

( * ) Notice: Subject to any disclaimer, the term of this patent is extended or adjusted under 35 U.S.C. 154(b) by 42 days.

(21) Appl. No.: 18/797,116

(22) Filed: Aug. 7, 2024

(65) Prior Publication Data

US 2026/0042396 A1     Feb. 12, 2026

(51) Int. Cl.
B60R 1/27 (2022.01)
B60R 1/12 (2006.01)
H04N 7/18 (2006.01)
H04N 23/90 (2023.01)

(52) U.S. Cl.
CPC ................. B60R 1/27 (2022.01); B60R 1/12 (2013.01); H04N 7/181 (2013.01); H04N 23/90 (2023.01); *B60R 2001/1223* (2013.01); *B60R 2001/1253* (2013.01); *B60R 2300/105* (2013.01)

(58) Field of Classification Search
CPC ..... B60R 1/27; B60R 1/12; B60R 2001/1223; B60R 2001/1253; B60R 2300/105; H04N 23/90; H04N 7/181
See application file for complete search history.

(56) References Cited

U.S. PATENT DOCUMENTS 5,570,127 A * 10/1996 Schmidt ................. H04N 7/181
                                                    348/E7.086
6,583,730 B2 * 6/2003 Lang ......................... B60R 1/28
                                                    348/148

8,339,252 B2    12/2012 Ozaki
10,046,703 B2    8/2018 Hoyda
10,127,463 B2   11/2018 Fursich
D914,791 S       3/2021 Sickler
11,034,298 B2    6/2021 Critchley
2002/0113875 A1 * 8/2002 Mazzilli .................... B60R 1/12
                                                    348/148

(Continued)

FOREIGN PATENT DOCUMENTS

CN          106907078      *  1/2017
CN          112631524      * 12/2020

(Continued)

OTHER PUBLICATIONS

Shang translation of CN 112631524 Dec. 29, 2020 (Year: 2020).*

(Continued)

*Primary Examiner* — Zaihan Jiang

(57)         ABSTRACT

A vehicle camera system for enhancing a driver's situational awareness includes a vehicle having an interior space, a dashboard, and a rearview mirror. A display panel positioned on the dashboard is visible to a user while driving. A plurality of rearview mirror cameras are coupled to the rearview mirror. Each rearview mirror camera captures video footage. A processor is electrically coupled to the plurality of rearview mirror cameras. A rearview mirror transmitter is electrically coupled to the processor. A dashboard transceiver is electrically coupled to the display panel. The dashboard transceiver is electrically coupled to the rearview mirror transmitter wherein the dashboard transceiver is configured to receive the video footage from the rearview mirror transmitter and wherein the display panel is configured to display the video footage in real time to facilitate visibility of surroundings of the vehicle to the user.

13 Claims, 9 Drawing Sheets

(56) References Cited

U.S. PATENT DOCUMENTS

| 2006/0164228 A1* | 7/2006 | Tseng ......................... B60R 1/26 348/148 |
|---|---|---|
| 2008/0055436 A1* | 3/2008 | Sarwari ................ H04N 25/134 348/E9.01 |
| 2010/0253597 A1* | 10/2010 | Seder .................... G01S 13/723 348/148 |
| 2013/0147953 A1* | 6/2013 | Rao ........................... B60R 1/26 348/148 |
| 2014/0136013 A1* | 5/2014 | Wolverton ............. B60K 35/28 701/1 |
| 2014/0136187 A1* | 5/2014 | Wolverton ............. G10L 15/22 704/9 |
| 2020/0180509 A1 | 6/2020 | Rodriguez Ortiz |
| 2021/0162923 A1 | 6/2021 | Friebe |
| 2023/0256905 A1* | 8/2023 | Ihlenburg ................ G06T 7/246 348/118 |

FOREIGN PATENT DOCUMENTS

| JP | 3151687 U | * | 7/2009 |
|---|---|---|---|
| WO | WO2018008007 | | 1/2018 |

OTHER PUBLICATIONS

Qin, Fang translation of CN 106907078 Jan. 17, 2017 (Year: 2017).*

Wu translation of JP 3151687 U Apr. 20, 2009 (Year: 2009).*

* cited by examiner

VEHICLE CAMERA SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to video monitoring systems and more particularly pertains to a new video monitoring system for enhancing a driver's situational awareness and enabling the driver to record events while driving.

(2) Description of Related Art Including Information Disclosed Under 37 CFR 1.97 and 1.98

The prior art relates to video monitoring systems. Video monitoring systems are becoming more prevalent, as the cost of cameras and other recording devices goes down. People often record themselves, and their surroundings, for safety purposes and for entertainment purposes. Some video monitoring systems can even be activated remotely, for example allowing users to turn cameras that are located within the user's home on and off from a remote location. Video monitoring systems are also becoming more common in vehicles. For example, many modern vehicles include cameras positioned on or around the front and rear bumpers, to enhance visibility for drivers and assist them with tasks such as parking and driving in reverse. However, the user needs to be physically located in the vehicle to actuate these cameras. The cameras are also typically focused on the front and rear of the vehicle, limiting the usefulness of the cameras for checking blind spots on the sides of the vehicle. Finally, the cameras are also typically positioned on the exterior of the vehicle, which means that the cameras are unable to obtain footage of events occurring within the vehicle. Thus, there is a need for a video monitoring system for a vehicle that can obtain footage of all sides of the vehicle, to facilitate the driver's situational awareness. Ideally, such a system would allow the user to actuate the cameras remotely and would provide the user with visibility into the interior of the vehicle.

BRIEF SUMMARY OF THE INVENTION

An embodiment of the disclosure meets the needs presented above by generally comprising a vehicle having an interior space. A dashboard is positioned within the interior space. A display panel is positioned on the dashboard wherein the display panel is configured to be visible to a user when the user is driving the vehicle. A rearview mirror is positioned within the interior space proximate to the dashboard wherein the rearview mirror is configured to be visible to the user when the user is driving the vehicle. A plurality of rearview mirror cameras are coupled to the rearview mirror. Each rearview mirror camera of the plurality of rearview mirror cameras captures video footage. A processor is electrically coupled to each rearview mirror camera of the plurality of rearview mirror cameras and actuates each rearview mirror camera of the plurality of rearview mirror cameras. A rearview mirror transmitter is electrically coupled to the processor. A dashboard transceiver is electrically coupled to the display panel. The dashboard transceiver is electrically coupled to the rearview mirror transmitter wherein the dashboard transceiver is configured to receive the video footage from the rearview mirror transmitter and wherein the display panel is configured to display the video footage in real time to facilitate visibility of surroundings of the vehicle to the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
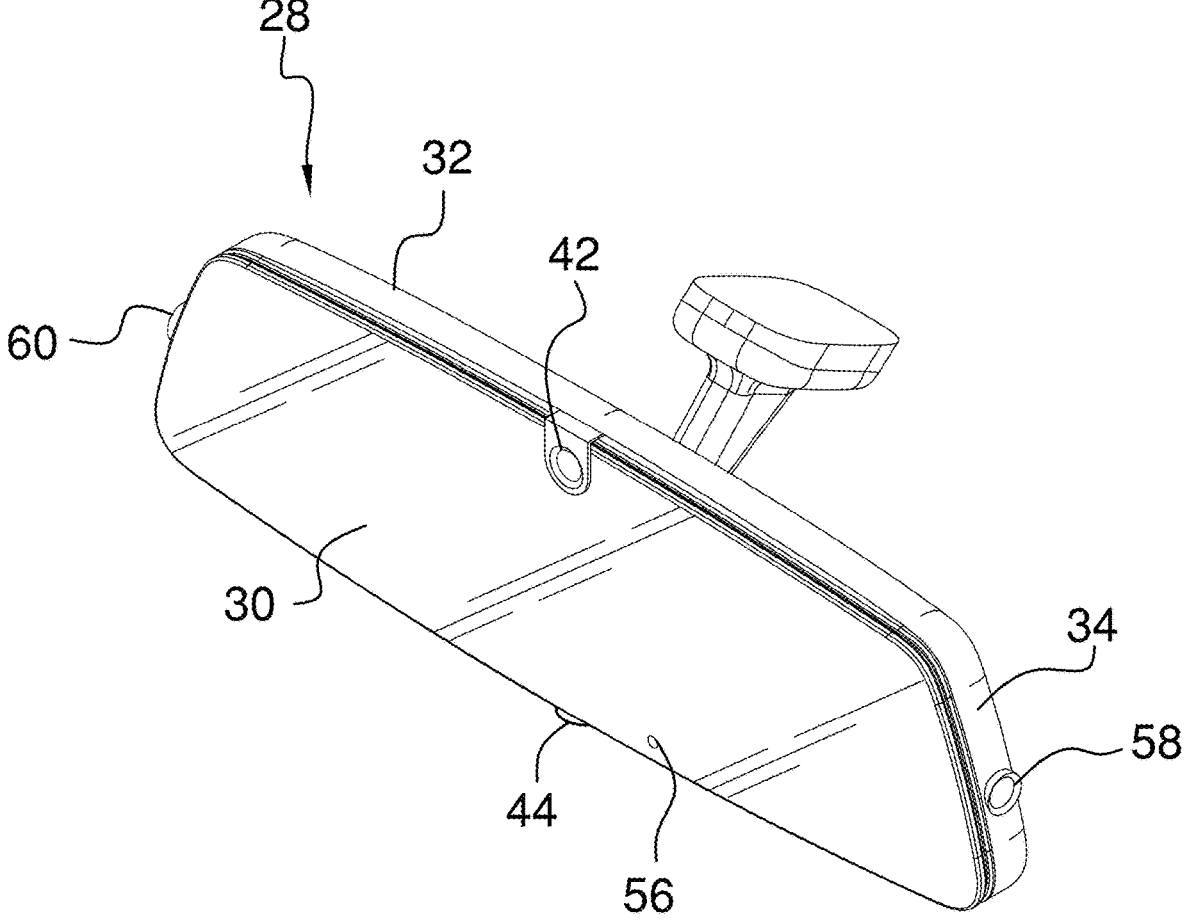
FIG. 1 is a front isometric view of a vehicle camera system according to an embodiment of the disclosure.
Figure 2:
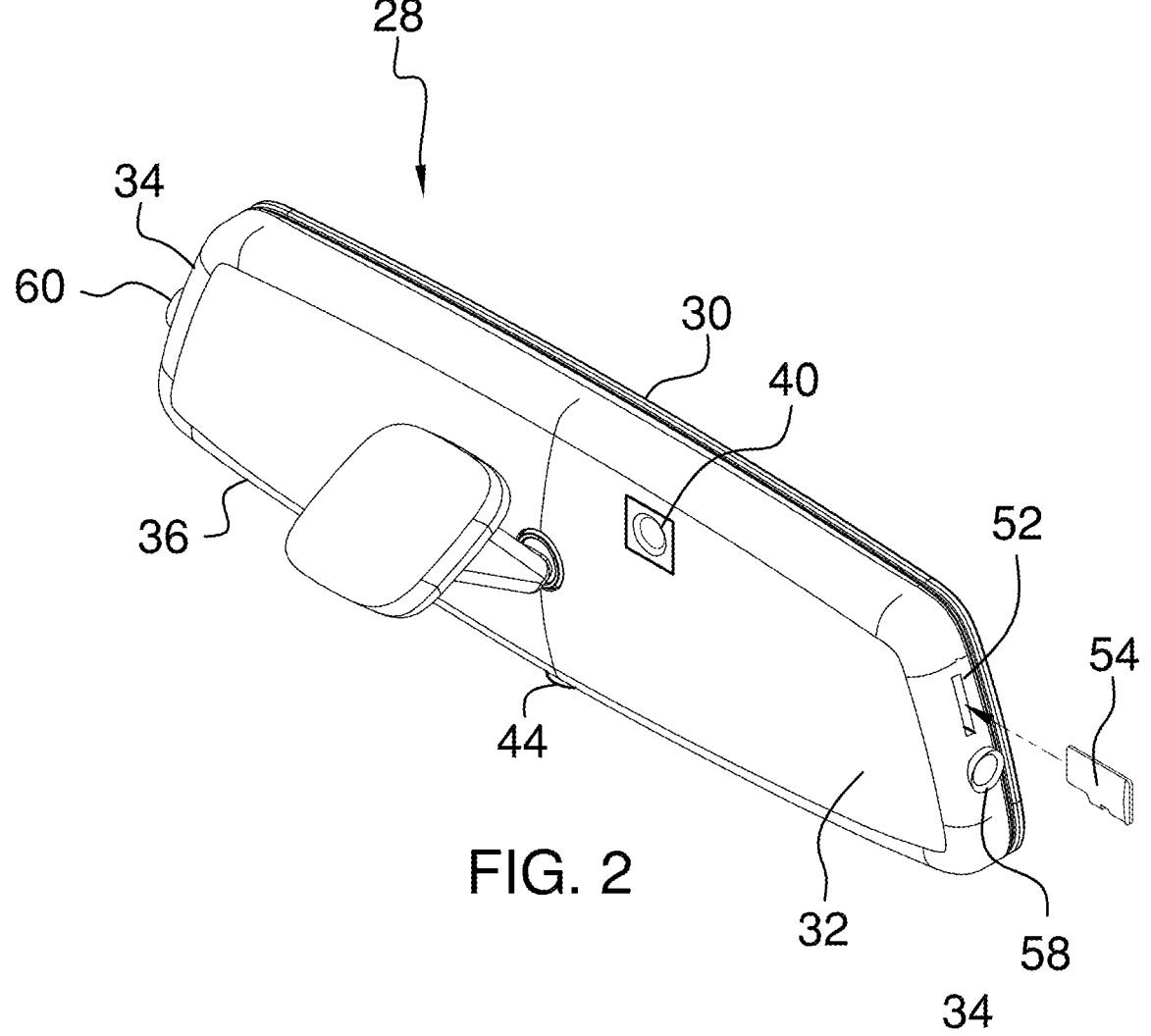
FIG. 2 is a back isometric view of an embodiment of the disclosure.
Figure 3:
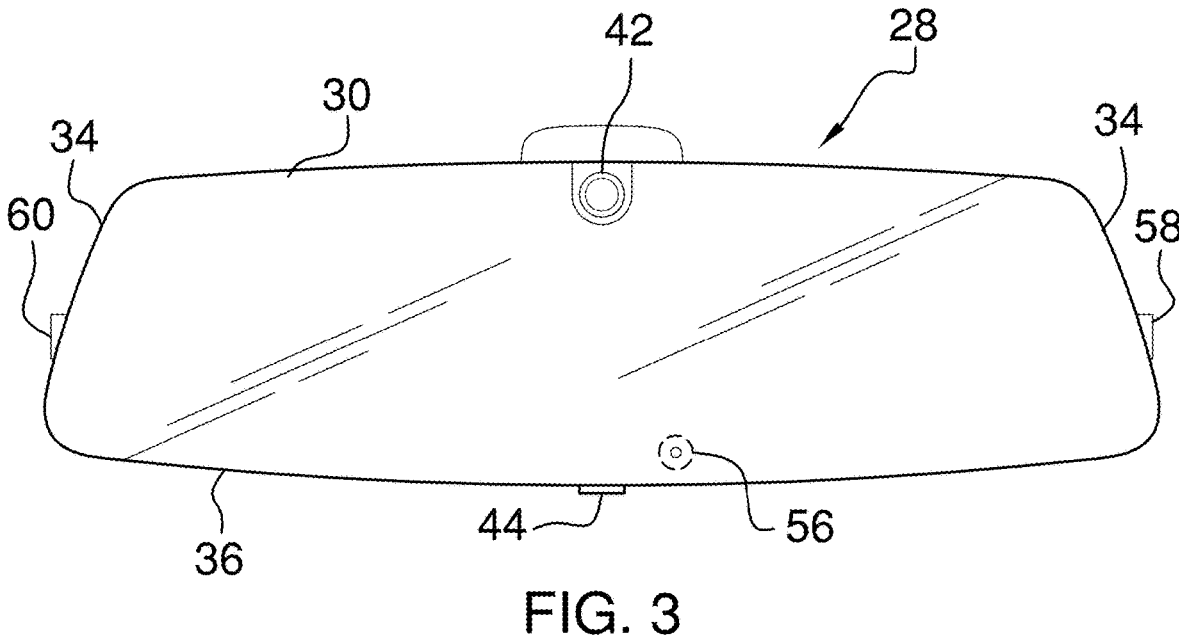
FIG. 3 is a front view of an embodiment of the disclosure.
Figure 4:
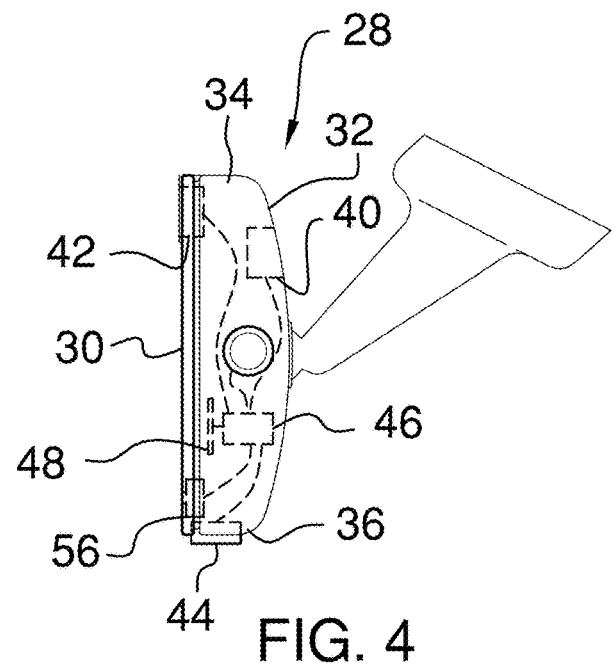
FIG. 4 is a side view of an embodiment of the disclosure.
Figure 5:
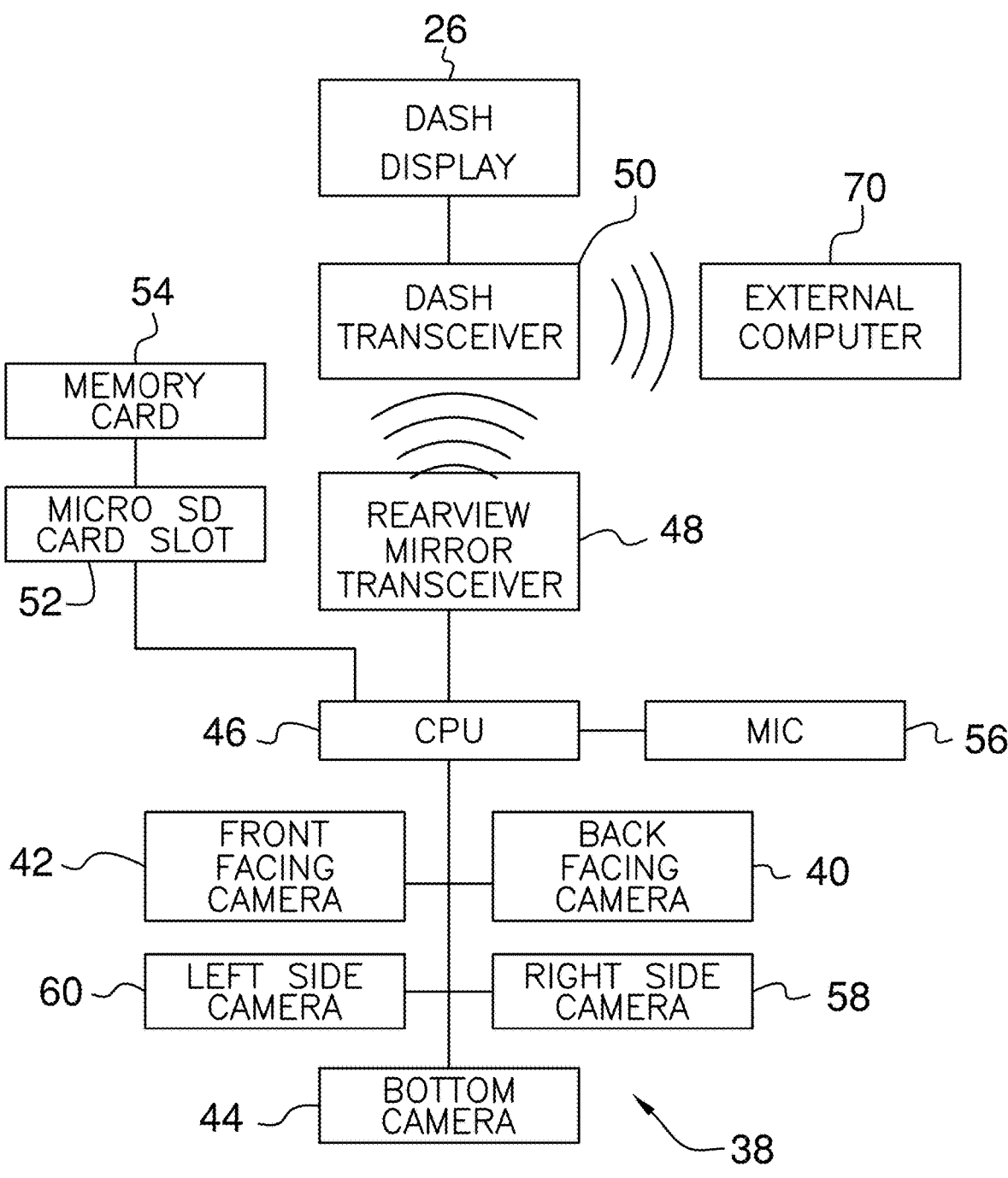
FIG. 5 is a block diagram view of an embodiment of the disclosure.
Figure 6:
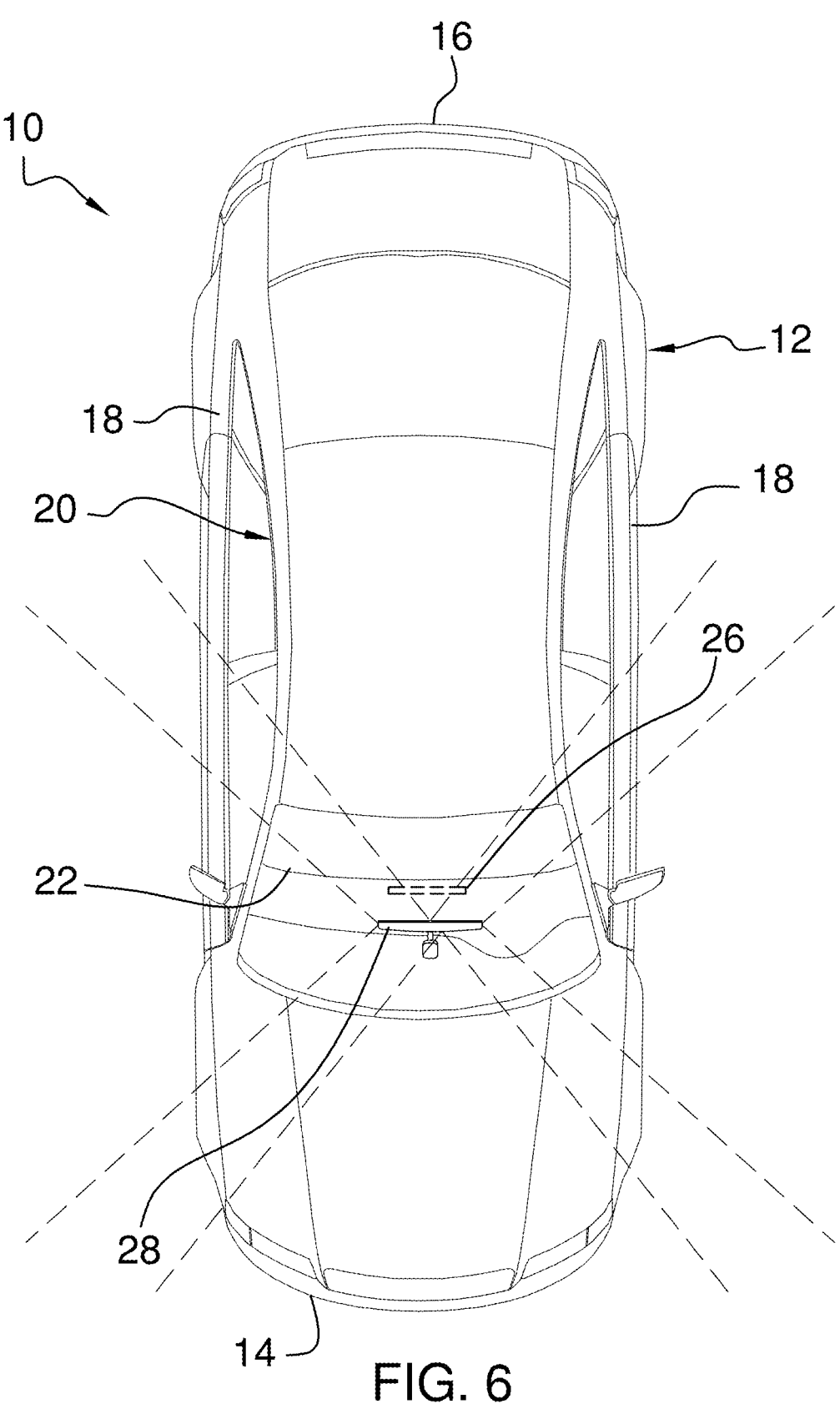
FIG. 6 is an in-use view of an embodiment of the disclosure.
Figure 7:
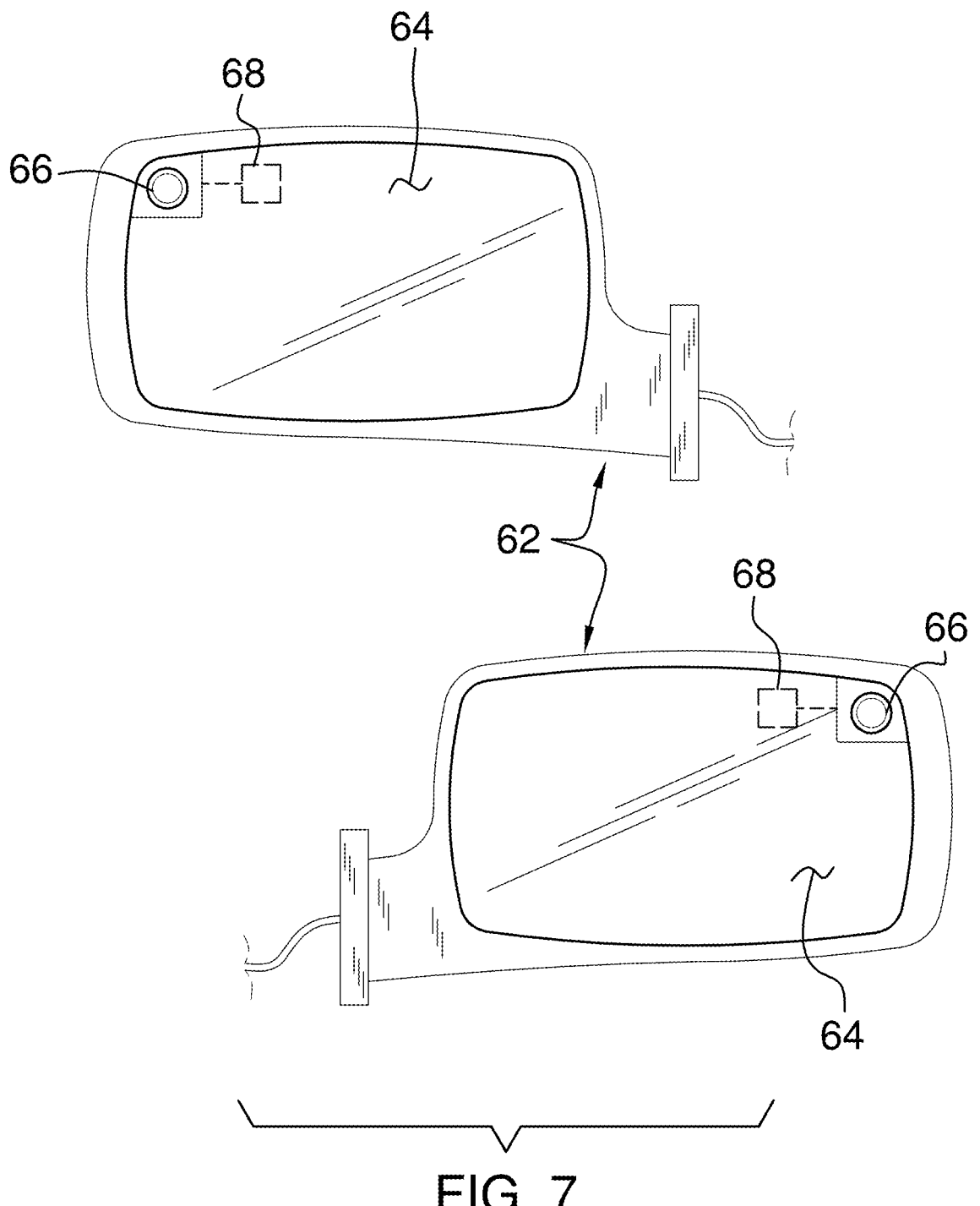
FIG. 7 is a front view of an embodiment of the disclosure.
Figure 8:
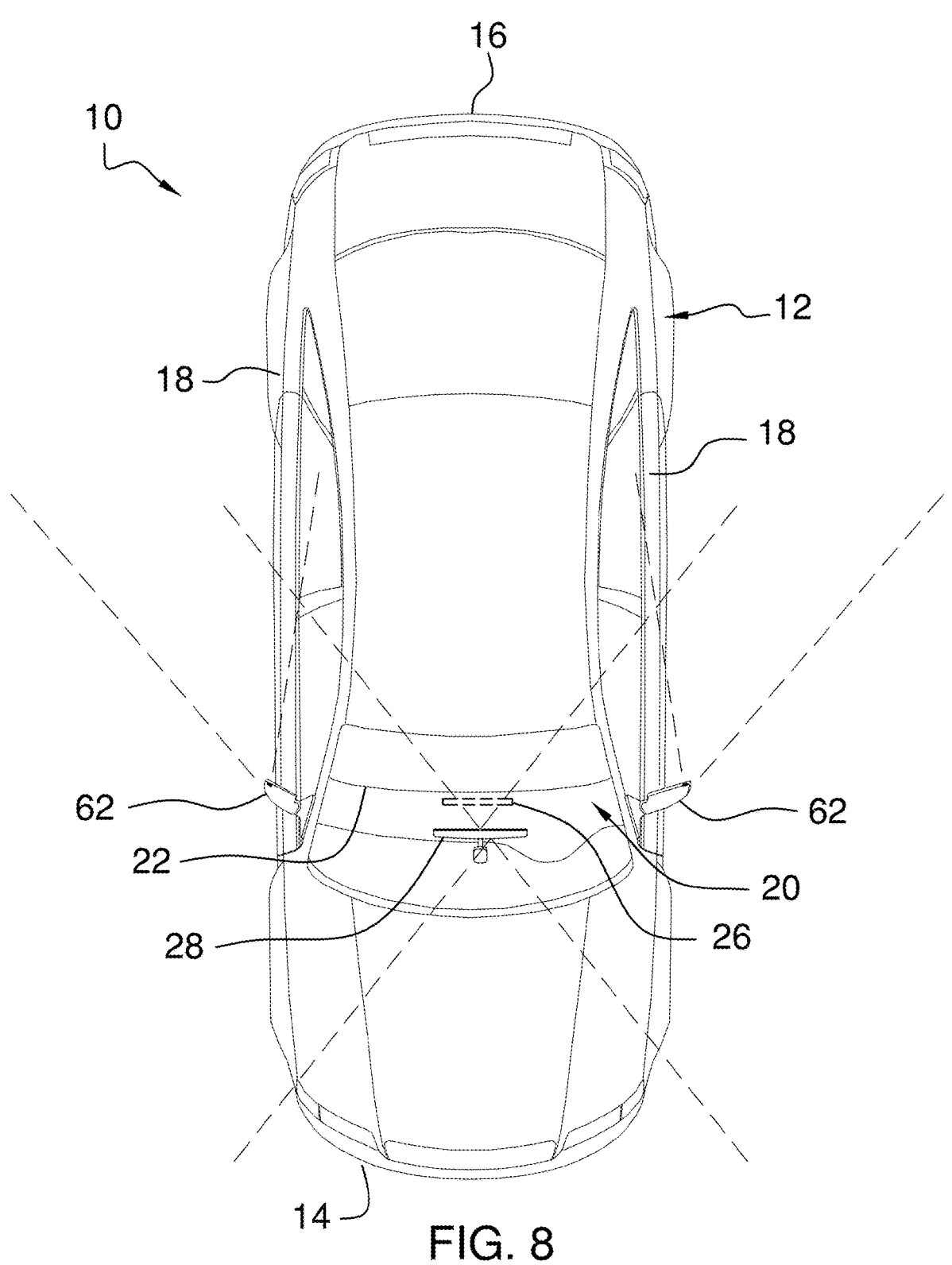
FIG. 8 is an in-use view of an embodiment of the disclosure.
Figure 9:
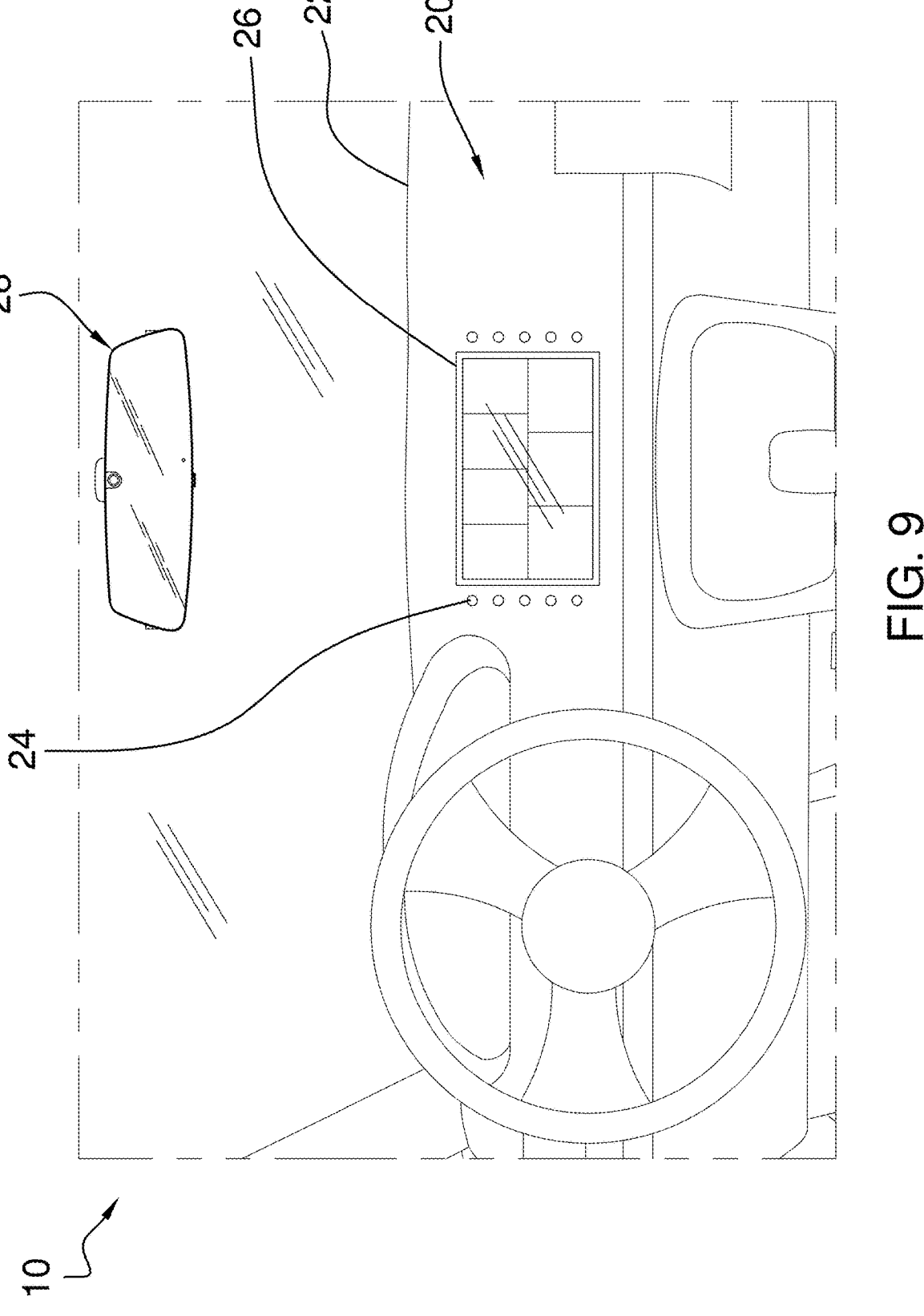
FIG. 9 is a detail view of an embodiment of the disclosure.
Figure 10:
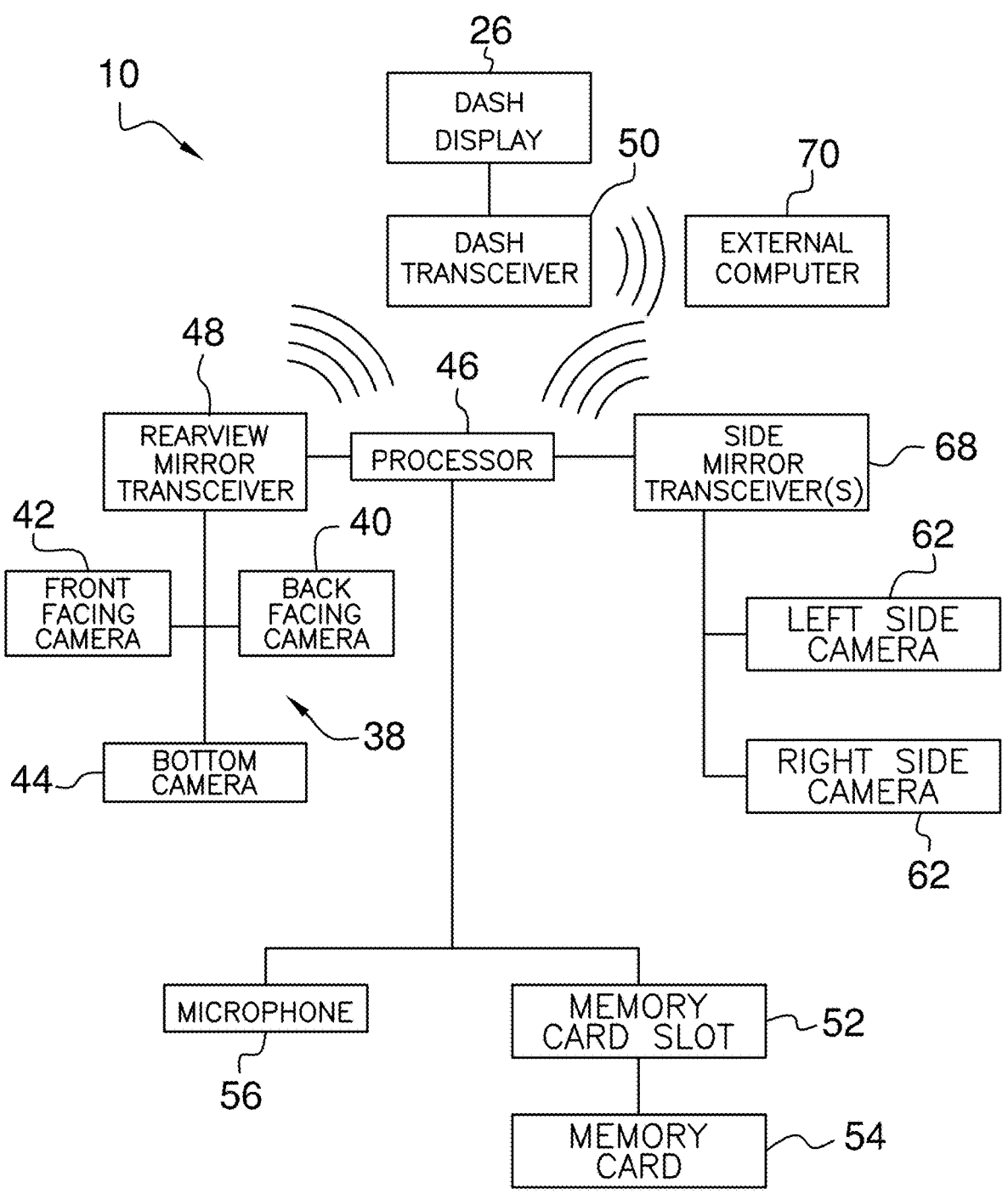
FIG. 10 is a block diagram view of an embodiment of the disclosure.

With reference now to the drawings, and in particular to FIGS. 1 through 10 thereof, a new video monitoring system embodying the principles and concepts of an embodiment of the disclosure and generally designated by the reference numeral 10 will be described.

As best illustrated in FIGS. 1 through 10, the vehicle camera system 10 generally comprises a vehicle 12. The vehicle 12 typically includes a vehicle front end 14, a vehicle rear end 16, and a pair of vehicle lateral sides 18 that are coupled to and extend between the vehicle front end 14 and the vehicle rear end 16 to define an interior space 20. A dashboard 22 is positioned within the interior space 20 proximate to the vehicle front end 14. The dashboard 22 may include a control panel 24. A display panel 26 is positioned on the dashboard 22. The display panel 26 is configured to be visible to a user when the user is driving the vehicle 12. The display panel 26 may include a touch screen.

A rearview mirror 28 is positioned within the interior space 20 proximate to the vehicle front end 14 wherein the rearview mirror 28 is configured to be visible to the user when the user is driving the vehicle 12. The rearview mirror 28 generally includes a rearview mirror front side 30 that faces the vehicle rear end 16 of the vehicle 12. The rearview mirror front side 30 is typically reflective wherein the rearview mirror front side 30 is configured to facilitate visibility of objects behind the vehicle 12. A rearview mirror back side 32 faces the vehicle front end 14 of the vehicle 12. A pair of rearview mirror lateral sides 34 are coupled to and extend between the rearview mirror front side 30 and the rearview mirror back side 32. Each rearview mirror 28 lateral side of the pair of rearview mirror lateral sides 34 faces a respective vehicle lateral side of the pair of vehicle lateral sides 18. A rearview mirror bottom side 36 is coupled to and extends between the rearview mirror front side 30 and the rearview mirror back side 32. The rearview mirror bottom side 36 also generally extends between the pair of rearview mirror lateral sides 34 and faces downwardly into the interior space 20.

A plurality of rearview mirror cameras 38 are coupled to the rearview mirror 28. Each rearview mirror camera of the plurality of rearview mirror cameras 38 captures video footage. The plurality of rearview mirror cameras 38 generally capture the video footage from within the interior space 20 and may also capture the video footage from the surrounding area outside the vehicle 12.

For example, a rear facing camera 40 may be positioned on the rearview mirror front side 30. The rear facing camera 40 is configured to obtain the video footage of objects behind the vehicle 12. The rear facing camera 40 may also obtain footage of objects within the interior space 20. A front facing camera 42 may be positioned on the rearview mirror back side 32 wherein the front facing camera 42 is configured to obtain the video footage of objects in front of the vehicle 12. The front facing camera 42 may also obtain footage of objects within the interior space 20, for example between the rearview mirror 28 and the front windshield of the vehicle 12. A downward facing camera 44 may be positioned on the rearview mirror bottom side 36. The downward facing camera 44 is configured to obtain the video footage of objects beneath the rearview mirror 28 and within the interior space 20.

In some embodiments, the plurality of rearview mirror cameras 38 may also include a first side facing camera 58 that is positioned on a first rearview mirror lateral side of the pair of rearview mirror lateral sides 34. The first side facing camera 58 is configured to obtain the video footage of objects on a first vehicle lateral side of the pair of vehicle lateral sides 18. The first side facing camera 58 may also obtain the video footage of the interior space 20.

Such embodiments may also include a second side facing camera 60 that is positioned on a second rearview mirror lateral side of the pair of rearview mirror lateral sides 34. The second side facing camera 60 is configured to obtain the video footage of objects on a second vehicle lateral side of the pair of vehicle lateral sides 18. The second side facing camera 60 may also obtain the video footage of the interior space 20.

A processor 46 may be positioned within the rearview mirror 28. The processor 46 is electrically coupled to each rearview mirror camera of the plurality of rearview mirror cameras 38 wherein the processor 46 actuates each rearview mirror camera of the plurality of rearview mirror cameras 38. For example, the processor 46 may be electrically coupled to one or both of the control panel 24 and the touch screen wherein the processor 46 is actuatable by one or both of the control panel 24 and the touch screen. A rearview mirror transceiver 48 may also be positioned within the rearview mirror 28. The rearview mirror transceiver 48 is electrically coupled to the processor 46.

A dashboard transceiver 50 is electrically coupled to the display panel 26. The dashboard transceiver 50 may be electrically coupled to, or in wireless communication with, the rearview mirror transceiver 48. The dashboard transceiver 50 is configured to receive the video footage from the rearview mirror transceiver 48. The display panel 26 is configured to display the video footage in real time to facilitate visibility of surroundings of the vehicle 12 to the user. The dashboard transceiver 50 may be electrically coupled to, or in wireless communication with, the processor 46 wherein the manipulation of one of the control panel 24 and the touch screen actuates the dashboard transceiver 50 to signal the processor 46 via the rearview mirror transceiver 48 to actuate the plurality of rearview mirror cameras 38. The dashboard transceiver 50 may be positioned within the dashboard 22.

A memory card slot 52 is electrically coupled to the processor 46. The memory card slot 52 is configured to receive a memory card 54. The processor 46 is configured to store the video footage from each rearview mirror camera of the plurality of rearview mirror cameras 38 on the memory card 54 when the memory card 54 is positioned within the memory card slot 52. The memory card slot 52 may be inset into one of the pair of rearview mirror lateral sides 34 and exposed within the one of the pair of rearview mirror lateral sides 34. In other embodiments, the memory card slot 52 may be inset into the dashboard 22 and exposed within the dashboard 22.

A microphone 56 may be electrically coupled to the processor 46. The microphone 56 may be positioned within the rearview mirror 28. In other embodiments, the microphone 56 may be positioned within the dashboard 22, although other placements of the microphone 56 are also contemplated. The microphone 56 is configured to detect an audio feed from within the interior space 20. The processor 46 may be configured to store the audio feed on the memory card 54 when the memory card 54 is positioned within the memory card slot 52.

A pair of side mirrors 62 may be coupled to the vehicle 12. Each side mirror of the pair of side mirrors 62 generally extends outwardly from a respective vehicle lateral side of the pair of vehicle lateral sides 18. Each side mirror of the pair of side mirrors 62 generally has a reflective front surface 64 that is angled to face inwardly toward the respective vehicle lateral side of the pair of vehicle lateral sides 18 and backwardly toward the vehicle rear end 16. The reflective front surface 64 of each side mirror of the pair of side mirrors 62 is configured to facilitate visibility of objects on the respective vehicle lateral side of the pair of vehicle lateral sides 18.

A pair of side mirror cameras 66 may be coupled to the pair of side mirrors 62. Each side mirror camera of the pair of side mirror cameras 66 may capture the video footage on the respective vehicle lateral side. Each side mirror camera of the pair of side mirror cameras 66 may also capture the video footage from within the interior space 20. For example, each side mirror camera of the pair of side mirror cameras 66 may be positioned on the reflective front surface 64 of a respective side mirror of the pair of side mirrors 62.

Each side mirror camera of the pair of side mirror cameras 66 may be electrically coupled to the processor 46 wherein the processor 46 is configured to actuate each side mirror camera of the pair of side mirror cameras 66. The display panel 26 may be configured to display the video footage from each side mirror of the pair of side mirror cameras 66 in real time wherein the pair of side mirror cameras 66 is configured to facilitate visibility of surroundings of the vehicle 12 and of the interior space 20 to the user.

A side mirror transceiver 68, or a pair of side mirror transceivers 68, may be electrically coupled to, or in wireless communication with, the dashboard transceiver 50. The side mirror transceiver 68, or each side mirror transceiver of the pair of side mirror transceivers 68, is configured to send the video footage from the pair of side mirror cameras 66 to the dashboard transceiver 50. The side mirror transceiver 68, or each side mirror transceiver of the pair of side mirror transceivers 68, may be configured to receive signals from the dashboard transceiver 50, for example when the processor 46 actuates each of the pair of side mirror cameras 66. The side mirror transceiver 68 may be positioned within one side mirror of the pair of side mirrors 62. Alternatively, each side mirror transceiver of the pair of side mirror transceivers 68 may be positioned within a respective side mirror of the pair of side mirrors 62.

In use, the plurality of rearview mirror cameras 38 allow the user to view the video footage from every direction surrounding the vehicle 12. Because the plurality of rearview cameras are positioned on the rearview camera, within the interior space 20 of the vehicle 12, the plurality of rearview mirror cameras 38 are also able to obtain the video footage from the interior space 20 of the vehicle 12. For example, the rear facing camera 40 may be able to capture the video footage from the interior space 20 and from the area behind the vehicle 12, the front facing camera 42 may be able to capture the video footage that primarily includes the area in front of the vehicle 12, and the downward facing camera 44 may be able to capture the video footage that primarily includes the area within the interior space 20. The first side facing camera 58 and the second side facing camera 60 of the plurality of rearview mirror cameras 38 may also be able to capture the video footage that includes views of both the interior space 20 and the area on each of the pair of vehicle lateral sides 18. In embodiments according to FIGS. 7 and 8, the pair of side mirror cameras 66 are able to obtain the video footage from the pair of vehicle lateral sides 18, both outside the vehicle 12 and within the interior space 20 of the vehicle 12.

The plurality of rearview mirror cameras 38 and the pair of side mirror cameras 66 may continuously capture the video footage. Alternatively, the user may manipulate either the control panel 24 or the touch screen of the display panel 26 to selectively actuate the plurality of rearview mirror cameras 38 and the pair of side mirror cameras 66. For example, the display panel 26 may display the video footage from all of the plurality of rearview mirror cameras 38 and the pair of side mirror cameras 66 simultaneously. In some embodiments, the user may also adjust which of the views from the plurality of rearview mirror cameras 38 and the pair of side mirror cameras 66 are visible on the display panel 26, for example using either the display panel 26 or the control panel 24.

When the memory card 54 is positioned within the memory card slot 52, the video footage from each of the plurality of rearview mirror cameras 38 and each of the pair of side mirror cameras 66 may be recorded and stored on the memory card 54. The memory card 54 may also store the audio feed which is captured by the microphone 56. Thus, the user may be able to record events such as traffic accidents or interactions with law enforcement, with the footage is captured from both inside and outside the vehicle 12.

In some embodiments, the dashboard transceiver 50 may wirelessly communicate with an external computing device, such as a cellular telephone or a server of a computer network. In such embodiments, the user may use the external computing device to signal the processor 46 to actuate each of the plurality of rearview mirror cameras 38 and the pair of side mirror cameras 66. For example, if the vehicle 12 is stolen, the user may remotely activate the plurality of rearview mirror cameras 38 to capture the video footage of the interior space 20 of the vehicle 12, assisting the user in identifying the thieves. The user may also remotely activate the microphone 56, to capture the audio feed from within the interior space 20 and further facilitate identification of the thieves. Similarly, the video footage from the exterior of the vehicle 12 may assist the user in identifying the location of the vehicle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A video monitoring system comprising:
   a vehicle having an interior space;
   a dashboard being positioned within the interior space;
   a display panel being positioned on the dashboard
   wherein the display panel is configured to be visible to
   a user when the user is driving the vehicle;

a rearview mirror being positioned within the interior space proximate to the dashboard wherein the rearview mirror is configured to be visible to the user when the user is driving the vehicle;

a plurality of rearview mirror cameras being coupled to the rearview mirror, each rearview mirror camera of the plurality of rearview mirror cameras capturing video footage, the plurality of rearview mirror cameras including:

a rear facing camera being positioned on the rearview mirror front side wherein the rear facing camera is configured to obtain video footage of objects behind the vehicle;

a front facing camera being positioned on the rearview mirror back side wherein the front facing camera is configured to obtain video footage of objects in front of the vehicle; and a downward facing camera being positioned on the rearview mirror bottom side wherein the downward facing camera is configured to obtain video footage of objects beneath the rearview mirror and within the interior space;

a processor being electrically coupled to the plurality of rearview mirror cameras wherein the processor actuates each rearview mirror camera of the plurality of rearview mirror cameras;

a rearview mirror transmitter being electrically coupled to the processor;

a dashboard transceiver being electrically coupled to the display panel, the dashboard transceiver being electrically coupled to the rearview mirror transmitter wherein the dashboard transceiver is configured to receive the video footage from the rearview mirror transmitter and wherein the display panel is configured to display the video footage in real time to facilitate visibility of surroundings of the vehicle to the user.

2. The video monitoring system of claim 1, the rearview mirror further comprising:

a rearview mirror front side facing a vehicle rear end of the vehicle;

a rearview mirror back side facing a vehicle front end of the vehicle;

a pair of rearview mirror lateral sides being coupled to and extending between the rearview mirror front side and the rearview mirror back side, each rearview mirror lateral side of the pair of rearview mirror lateral sides facing a respective vehicle lateral side of a pair of vehicle lateral sides of the vehicle; and a rearview mirror bottom side being coupled to and extending between the rearview mirror front side and the rearview mirror back side.

3. The video monitoring system of claim 1, the plurality of rearview mirror cameras further comprising:

a first side facing camera being positioned on a first rearview mirror lateral side of the pair of rearview mirror lateral sides wherein the first side facing camera is configured to obtain the video footage of objects on a first vehicle lateral side of the pair of vehicle lateral sides; and a second side facing camera being positioned on a second rearview mirror lateral side of the pair of rearview mirror lateral sides wherein the second side facing camera is configured to obtain the video footage of objects on a second vehicle lateral side of the pair of vehicle lateral sides.

4. The video monitoring system of claim 1, further comprising:

a pair of side mirrors being coupled to the vehicle, each side mirror of the pair of side mirrors extending outwardly from a respective vehicle lateral side of the pair of vehicle lateral sides, each side mirror of the pair of side mirrors having a reflective front surface wherein the pair of side mirrors are configured to facilitate visibility of objects on the respective vehicle lateral side;

a pair of side mirror cameras being coupled to the pair of side mirrors, each side mirror camera of the pair of side mirror cameras being positioned on the reflective front surface of a respective side mirror of the pair of side mirrors, each side mirror camera of the pair of side mirror cameras being electrically coupled to the processor wherein the processor is configured to actuate each side mirror camera of the pair of side mirror cameras, the display panel being configured to display the video footage from each side mirror of the pair of side mirror cameras in real time wherein the pair of side mirror cameras is configured to facilitate visibility of surroundings of the vehicle to the user; and a side mirror transceiver being in wireless communication with the dashboard transceiver wherein the side mirror transceiver is configured to send the video footage from the pair of side mirror cameras to the dashboard transceiver.

5. The video monitoring system of claim 4, further comprising a memory card slot being electrically coupled to the processor, the memory card slot being configured to receive a memory card, the processor being configured to store the video footage from each rearview mirror camera of the plurality of rearview mirror cameras and from each side mirror camera of the pair of side mirror cameras on the memory card when the memory card is positioned within the memory card slot.

6. The video monitoring system of claim 1, further comprising a memory card slot being electrically coupled to the processor, the memory card slot being configured to receive a memory card, the processor being configured to store the video footage from each rearview mirror camera of the plurality of rearview mirror cameras on the memory card when the memory card is positioned within the memory card slot.

7. The video monitoring system of claim 6, wherein the memory card slot is inset into the rearview mirror and wherein the memory card slot is exposed within the rearview mirror.

8. The video monitoring system of claim 6, wherein the memory card slot is inset into the dashboard and wherein the memory card slot is exposed within the dashboard.

9. The video monitoring system of claim 6, further comprising a microphone being electrically coupled to the processor, the microphone being positioned within the rearview mirror wherein the microphone is configured to detect an audio feed from within the interior space, the processor being configured to store the audio feed on the memory card when the memory card is positioned within the memory card slot.

10. The video monitoring system of claim 1, further comprising a microphone being electrically coupled to the processor, the microphone being positioned within the rearview mirror wherein the microphone is configured to detect an audio feed from within the interior space.

11. A video monitoring system comprising:

a vehicle having a vehicle front end, a vehicle rear end, and a pair of vehicle lateral sides being coupled to and extending between the vehicle front end and the vehicle rear end to define an interior space;

a dashboard being positioned within the interior space proximate to the vehicle front end;

a display panel being positioned on the dashboard wherein the display panel is configured to be visible to a user when the user is driving the vehicle;

a rearview mirror being positioned within the interior space proximate to the vehicle front end wherein the rearview mirror is configured to be visible to the user when the user is driving the vehicle, the rearview mirror including:

a rearview mirror front side facing the vehicle rear end of the vehicle, the rearview mirror front side being reflective wherein the rearview mirror front side is configured to facilitate visibility of objects behind the vehicle;

a rearview mirror back side facing the vehicle front end of the vehicle;

a pair of rearview mirror lateral sides being coupled to and extending between the rearview mirror front side and the rearview mirror back side, each rearview mirror lateral side of the pair of rearview mirror lateral sides facing a respective vehicle lateral side of the pair of vehicle lateral sides;

a rearview mirror bottom side being coupled to and extending between the rearview mirror front side and the rearview mirror back side, the rearview mirror bottom side extending between the pair of rearview mirror lateral sides;

a plurality of rearview mirror cameras being coupled to the rearview mirror, each rearview mirror camera of the plurality of rearview mirror cameras capturing video footage, the plurality of rearview mirror cameras including:

a rear facing camera being positioned on the rearview mirror front side wherein the rear facing camera is configured to obtain video footage of objects behind the vehicle and of objects within the interior space;

a front facing camera being positioned on the rearview mirror back side wherein the front facing camera is configured to obtain video footage of objects in front of the vehicle;

a downward facing camera being positioned on the rearview mirror bottom side wherein the downward facing camera is configured to obtain video footage of objects within the interior space beneath the rearview mirror;

a processor being positioned within the rearview mirror, the processor being electrically coupled to each rearview mirror camera of the plurality of rearview mirror cameras wherein the processor actuates each rearview mirror camera of the plurality of rearview mirror cameras;

a rearview mirror transceiver being positioned within the rearview mirror, the rearview mirror transceiver being electrically coupled to the processor;

a dashboard transceiver being electrically coupled to the display panel, the dashboard transceiver being in wireless communication with the rearview mirror transceiver wherein the dashboard transceiver is configured to receive the video footage from the rearview mirror transceiver and wherein the display panel is configured to display the video footage in real time to facilitate visibility of surroundings of the vehicle to the user;

a memory card slot being electrically coupled to the processor, the memory card slot being configured to receive a memory card, the processor being configured to store the video footage from each rearview mirror camera of the plurality of rearview mirror cameras on the memory card when the memory card is positioned within the memory card slot, the memory card slot being inset into one of the pair of rearview mirror lateral sides, the memory card slot being exposed within the one of the pair of rearview mirror lateral sides; and a microphone being electrically coupled to the processor, the microphone being positioned within the rearview mirror wherein the microphone is configured to detect an audio feed from within the interior space, the processor being configured to store the audio feed on the memory card when the memory card is positioned within the memory card slot.

12. The video monitoring system of claim 11, the plurality of rearview mirror cameras further comprising:

a first side facing camera being positioned on a first rearview mirror lateral side of the pair of rearview mirror lateral sides wherein the first side facing camera is configured to obtain the video footage of objects on a first vehicle lateral side of the pair of vehicle lateral sides; and a second side facing camera being positioned on a second rearview mirror lateral side of the pair of rearview mirror lateral sides wherein the second side facing camera is configured to obtain the video footage of objects on a second vehicle lateral side of the pair of vehicle lateral sides.

13. The video monitoring system of claim 11, further comprising:

a pair of side mirrors being coupled to the vehicle, each side mirror of the pair of side mirrors extending outwardly from a respective vehicle lateral side of the pair of vehicle lateral sides, each side mirror of the pair of side mirrors having a reflective front surface being angled to face inwardly toward the respective vehicle lateral side of the pair of vehicle lateral sides and backwardly toward the vehicle rear end wherein the pair of side mirrors are configured to facilitate visibility of objects on the respective vehicle lateral side;

a pair of side mirror cameras being coupled to the pair of side mirrors, each side mirror camera of the pair of side mirror cameras capturing the video footage, each side mirror camera of the pair of side mirror cameras being positioned on the reflective front surface of a respective side mirror of the pair of side mirrors, each side mirror camera of the pair of side mirror cameras being electrically coupled to the processor wherein the processor is configured to actuate each side mirror camera of the pair of side mirror cameras, the display panel being configured to display the video footage from each side mirror of the pair of side mirror cameras in real time wherein the pair of side mirror cameras is configured to facilitate visibility of surroundings of the vehicle to the user; and a pair of side mirror transceivers being in wireless communication with the dashboard transceiver wherein each side mirror transceiver of the pair of side mirror transceivers is configured to send the video footage from the pair of side mirror cameras to the dashboard transceiver, each side mirror transceiver of the pair of side mirror transceivers being positioned within a respective side mirror of the pair of side mirrors.

* * * * *